WEATHERABLE FILM AND PROCESS FOR PRODUCING SAME
Filed July 23, 1958
2,917,402
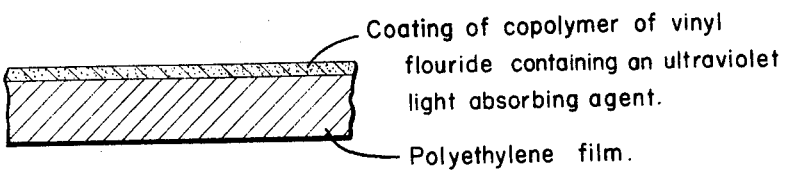
Coating of copolymer of vinyl flouride containing an ultraviolet light absorbing agent.
Polyethylene film.
INVENTOR
DAVID IVAN SAPPER

2,917,402

WEATHERABLE FILM AND PROCESS FOR PRODUCING SAME

David Ivan Sapper, Buffalo, N.Y., assignor to E. I. du Pont de Nemours and Company, Wilmington, Del., a corporation of Delaware Application July 23, 1958, Serial No. 750,371

14 Claims. (Cl. 117—33.3)

This invention relates to coated, flexible, non-fibrous organic polymer films, and more particularly to polyethylene film having at least one surface thereof coated with an adherent, weatherable, ultraviolet light absorbent coating.

It is well known that polyethylene films when subjected to sunlight, deteriorate rapidly. The ultraviolet rays (in the spectral range of 290–400 millimicrons) present in sunlight tend to degrade and embrittle the films and reduce the level of their physical properties.

The use of certain chemical compounds as ultraviolet light absorbers in connection with organic polymer films is also well known. Heretofore these compounds have either been incorporated directly into the polymer prior to forming the film, or they have been coated on the surface of the polymeric film. The first method, i.e., incorporating the ultraviolet light screening agents directly into the polymer, affords some measure of protection, but suffers the disadvantage that the screening agent is distributed throughout the film, and hence the procedure is uneconomical and more importantly, it is not completely successful since much of the harmful ultraviolet radiation penetrates and deteriorates the film before reaching the too well-distributed absorber. Concentrating the absorber on the surface of the film, e.g., in a coating, offers much more effective protection. However, polymeric coatings usually employed generally also tend to be degraded by ultraviolet light with consequent embrittlement and separation from the base film. Moreover, absorbers are often not thoroughly compatible with the polymeric material and readily blush out or migrate from the coating or film.

It is an object of this invention, therefore, to provide a process for the production of polyethylene films having coatings deposited thereon which are inherently highly resistant to the adverse effects of ultraviolet light and which adhere well to the non-weatherable base film. Another object is to provide weatherable films of polyethylene resistant to the degrading action of ultraviolet light. The foregoing and additional objects will more clearly appear from the description which follows.

These objects are realized by the present invention which, briefly stated, comprises coating at least one surface of polyethylene film with a volatile organic solvent solution of (1) a copolymer comprised essentially of from 85% to 15% by weight of vinyl fluoride and from 15% to 85% of at least one vinyl ester of an aliphatic monocarboxylic acid having from 2 to 20 carbon atoms; and (2) from 5% to 25% by weight of an ultraviolet light absorber compatible with said copolymer, based on the total weight of solids (i.e., copolymer and light absorber) in said solution, and thereafter drying the coated film to remove the solvent from the coating.

Copolymers of vinyl fluoride and vinyl esters of saturated aliphatic monocarboxylic acids in film form and as coatings are transparent, substantially colorless, flexible and tough, and are exceptionally light stable. Moreover, the coatings when applied to polyethylene surfaces from organic solvent solution adhere strongly to such surfaces. The present application of these polymers therefore results in a product characterized by a substrate of polyethylene film having concentrated on at least one surface thereof ultraviolet light absorbent material incorporated in an adherent, transparent carrier or coating of a copolymer which itself is highly resistant to the destructive action of ultraviolet light, and which is readily applied to the substrate from solution by conventional coating techniques. The product is illustrated in the cross-sectional view of the accompanying drawing.

The polyethylene film employed as the base film or substrate of the product of this invention may be formed from solid ethylene polymers such as are produced by the processes described in U.S. Patents 2,153,553 and 2,188,465, or there may be employed the linear, high density polymers of polyethylene described and claimed in U.S. Patent 2,816,833.

The copolymer constitutent of the coating compositions of the present invention is comprised of from 15–85% by weight of vinyl fluoride copolymerized with from 85–15% by weight of a vinyl ester of an aliphatic monocarboxylic acid having a carbon content of from 2–20 carbon atoms. The vinyl ester component contributes the solubility needed for application as a coating. The lower vinyl ester limit utilized is governed by the solubility of the copolymer. The upper limit will be governed primarily by mechanical properties (tackiness, tensile properties, shock brittleness, etc.) and secondarily by inherent weatherability. Preferred vinyl esters are vinyl acetate, vinyl stearate, vinyl pivalate and vinyl 2-ethylhexoate. Mixtures of vinyl esters, e.g., a mixture of vinyl acetate and vinyl stearate, may also be utilized in the copolymer.

After copolymerization which may be carried out by any of the techniques known to the art, coating of the base film may be effected by dissolving the vinyl fluoride/vinyl ester copolymer in a suitable solvent, such as dioxane or methyl ethyl ketone. The ultraviolet light absorber is added directly to the solvent solution, and the resulting composition may be doctored onto one or both sides of the base film. The film is then dried.

The ultraviolet light absorbing compound, to be suitable as a screening agent in the coating compositions of the present invention, must possess the following properties: (1) high absorptive capacity for the sunlight ultraviolet light region of the spectrum (290–400 millimicrons); (2) ability to dissipate absorbed energy in a manner that neither physically damages the polymer nor produces color; (3) stability against self-destruction by absorbed energy; (4) compatibility with the polymeric coating; (5) resistance to the action of water when assimilated in the film surface; (6) freedom from odor and color.

Of particular importance is the prerequisite that the ultraviolet absorber be compatible with the copolymeric coating. The compatibility of the ultraviolet absorber with the vinyl fluoride/vinyl ester coating compositions of the present invention is tested as follows: Twenty percent of the absorber, based upon the weight of copolymer is incorporated into the particular vinyl fluorine/vinyl ester coating composition to be utilized, and the coating composition is applied to one side of a polyethylene film strip. The coated film is dried for 10 minutes at 50°–70° C., and the film is then allowed to stand for 24 hours at room temperature. If no blushing effect (diffusion of the ultraviolet absorber out of the coating) is observed, the absorber is deemed compatible with the copolymeric coating utilized.

The most useful absorbers are the substituted benzophenone derivatives of the formula

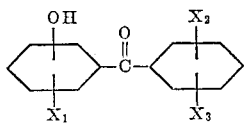

wherein $X_1$, $X_2$ and $X_3$ are selected from the group consisting of hydrogen, hydroxy, alkyl, alkoxy and halogen. The preferred substituted benzophenone derivatives include 2,2′,4,4′-tetrahydroxybenzophenone, 2-hydroxy-4-methoxybenzophenone, 2,2′-dihydroxy-4-methoxy-4′-ethoxy-benzophenone, 2-hydroxy-4-pentadecylbenzophenone and dibenzyl resorcinol. Also preferred is the commercially available mixture of benzophenone derivatives known as "Uvinul" 490 (2,2′-dihydroxy-4,4′-dimethoxybenzophenone together with a mixture of other tetrasubstituted benzophenones, manufactured by General Aniline & Film Corporation). Other useful ultraviolet absorbers which may be employed, depending on the compatibility with the particular copolymeric composition used, are the chrome complex of p-aminobenzoic acid, phenyl salicylate, resorcinol, dibenzoyl resorcinol, pentadecyl dibenzoyl resorcinol and 2-mercaptobenzothiazole.

The amount of ultraviolet absorber added to the copolymeric coating composition will be determined by the limit of compatibility between the coating composition and the ultraviolet absorber. Normally, the upper limit on the amount of absorber that can be added will be in the neighborhood of 20% based on the total weight of solids (absorber plus copolymer) in the coating composition. The lower limit will depend on the coating thickness and the efficiency of the particular absorber. Satisfactory improvement in the resistance to ultraviolet light was obtained by using 5% based on the total weight of the solids, of the ultraviolet absorber. The thickness of the coatings applied to the polyethylene may vary between 0.01–1.5 mil, with 0.05–1.0 mil being preferred.

The following examples of certain preferred embodiments are given to further illustrate the principles and practice of this invention.

EXAMPLES 1–9

In these examples, samples of 0.0015″ thick polyethylene film were coated with vinyl fluoride copolymeric compositions, specified in Table I, from solvent solution to which an ultraviolet light screening agent had been added.

Coating was effected by preparing a 10–25% solution of the respective vinyl fluoride copolymers in methyl ethyl ketone or dioxane, as specified in Table I. The ultraviolet light absorber was incorporated directly into the solvent solution. The coating composition was doctored onto both sides of the film using a coating knife set to an opening of from 4–8 mils. The film was dried at 50°–70° C. for 10 minutes. Accelerated weathering tests were conducted at 55° C. in a constant temperature box, in which samples were exposed on a turntable, rotating at a speed of 33⅓ revolutions per minute, to ultraviolet light of 5 Westinghouse FS–20–T–12 fluorescent sunlamps (radiation from 280 millimicrons and up). Failure of the coated polyethylene samples was judged subjectively as the point at which the film had no elongation. Table I, below, lists the comonomer copolymerized with the vinyl fluoride, the mol percent of the comonomer in the copolymeric composition, the coating thickness per side in mils, the ultraviolet light absorbing compounds employed, the amount of ultraviolet light absorber employed in terms of percent based on total solids and the results of the accelerated weathering tests in hours to failure for both an uncoated control film and the coated film.

*Table I*

| Example No. | Monomers Copolymerized with Vinyl Fluoride | Percent by Weight Vinyl Fluoride and Monomer Copolymerized therewith | | U.V. Light Absorber added | Percent by Weight of U.V. Light Absorber Added | Coating Thickness per side (mil) | Accelerated Weathering Test (Hours to Failure) | |
|---|---|---|---|---|---|---|---|---|
| | | Vinyl Fluoride | Monomer | | | | Uncoated Control Film | Coated Film |
| 1* | Vinyl acetate | 72.3 | 27.7 | "Uvinul" 490 | 16.67 | 0.1–0.3 | 160 | 990 |
| 2* | Vinyl pivalate | 72.5 | 27.5 | ---do--- | 16.67 | 0.3 | 200 | 420 |
| 3* | Vinyl acetate | 76.7 | 20.3 | ---do--- | 16.67 | 0.75 | 200 | 2,070 |
| 4** | Vinyl stearate | 42.0 | 58.0 | ---do--- | 16.67 | 0.8 | 200 | 2,400 |
| 5** | ---do--- | 47.9 | 52.1 | ---do--- | 16.67 | 0.75 | 200 | 1,025 |
| 6* | {Vinyl acetate / Vinyl stearate} | 59.1 | 40.9 | ---do--- | 16.67 | 0.15 | 50 | 550 |
| 7*** | Vinyl-2-ethyl-hexoate | 60.5 | 39.5 | ---do--- | 16.67 | 0.4 | 70 | 1,000 |
| 8**** | Vinyl acetate | 84.4 | 15.6 | 2-hydroxy-4-pentadecylbenzophenone | 16.00 | 0.4 | 350 | 1,500 |
| 9**** | ---do--- | 84.4 | 15.6 | dibenzoyl resorcinol | 16.00 | 0.4 | 350 | 1,500 |

*10% solution of the copolymer in methyl ethyl ketone.
**25% solution of the copolymer in methyl ethyl ketone.
***10% solution of the copolymer in dioxane.
****10.6% solution of the copolymer in methyl ethyl ketone.

As can be seen from Table I, the coated films prepared in accordance with the process of the present invention exhibit greatly increased resistance to the effects of ultraviolet light.

The polyethylene films treated in the manner discussed hereinbefore exhibit greatly increased resistivity to the deleterious effects of ultraviolet light. The steps of coating these films with a composition comprising selected copolymers of vinyl fluoride, which themselves possess a considerably higher degree of resistance to the effects of ultraviolet light than do the base films, and additionally incorporating an ultraviolet light absorbing agent into the coating composition, makes it possible to effect a unique two-fold defense barrier against the ultraviolet light waves. Substantially longer film life is realized thereby. The coatings characteristic of the present invention adhere well to the base film and thus are not readily peeled from the film under actual outdoor weathering conditions. These weatherable films represent a great advance over those prepared according to methods now known to the art. The ultraviolet light waves are effectively stopped at the surface of the film which is not the case where ultraviolet screening agent is incorporated into the polymer directly. Furthermore, the coatings of the films, being more resistant to the effects of ultraviolet light than coatings used hereinbefore, do not degrade quickly or peel or strip from the base film thereby rendering the incorporated ultraviolet screening agent inoperative. The production of these weatherable films lays open a multitude of new outdoor uses for these materials. Following are some of the many uses to which the coated films of this invention may be put: Plastic glazing materials for use in farm buildings, warehouses, greenhouses, radomes, potting beds, chicken coops and temporary living quarters; perforated window screens; coverings to replace storage structures, e.g., silos, etc.; glass replacement materials in semi-permanent light-weight aluminum type storm windows; windows for convertible automobiles and trailers; portable windows for marine use, aircraft and outdoor telephone booths. The films of this invention may also be used in laminations to other materials such as plywood, aluminum, steel, fabrics, etc., used for outdoor furniture, outdoor signs, awnings, venetian blinds, automobile trim, automobile convertible tops, traffic markers, automobile accessories, wrapping for electric wires for outdoor use, etc. Other uses are: Transparent covers for farming purposes such as hot caps for plants, vegetables and other crops to afford protection from frost, wind, hail, etc.; protective coverings and tarpulins for boats, automobiles, motorcycles and other vehicles and athletic fields; covering for airplane wings and fuselage; coverings for growing bananas; fumigation blankets for killing insects and bacteria in the soil; ground coverings for mulching; tree trunk wrap to exclude boring insects; liners for water storage ponds; protective shrouds for outdoor depot-type stock pilings; tank liners and crop covers for hydroponics farming installations; automobile tire wrap, etc.; lining materials for irrigation ditches and rain gutters; pipe and wire wrap; outdoor pools and tanks; marine cordage; high altitude balloons, boat sails, etc.

Further applications of such films are: As packaging or wrapping material where the material wrapped is subjected to outdoor weather conditions and other corrosive attack, such as protective coverings for plastic foam structures of all varieties; fabric for harvesting sacks, etc.; fabric replacement materials such as upholstery material in convertible automobiles; fabric for umbrellas and miscellaneous rainwear, beach sandals, beach umbrellas; material for outer wear, window shades, life rafts and life jackets, etc.

I claim:

1. An article of manufacture comprising a film of polyethylene at least one surface of which is coated with a continuous, adherent coating comprising essentially a copolymer of vinyl fluoride and at least one vinyl ester of a saturated aliphatic monocarboxylic acid having from 2 to 20 carbon atoms, said copolymer containing from 85% to 15% by weight of vinyl fluoride, said coating having incorporated therein from 5% to 25% by weight, based on the total weight of the coating, of a colorless ultraviolet light absorbent material compatible with said copolymer.

2. The article of claim 1 wherein the ultraviolet light absorbent material is a substituted benzophenone derivative having the formula

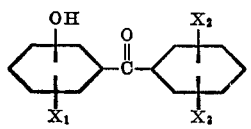

wherein $X_1$, $X_2$ and $X_3$ are each a radical selected from the group consisting of hydrogen, halogen, hydroxy, alkyl and alkoxy.

3. The article of claim 1 wherein the vinyl ester is vinyl acetate.

4. The article of claim 3 wherein the ultraviolet light absorbent material is a mixture of tetra-substituted benzophenone derivatives having the formula

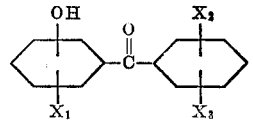

wherein $X_1$, $X_2$ and $X_3$ are each a radical selected from the group consisting of halogen, hydrogen, hydroxy, alkyl and alkoxy, said mixture containing a major proportion of 2,2'-dihydroxy-4,4'-dimethoxybenzophenone.

5. The article of claim 3 wherein the ultraviolet light absorbent material is dibenzoyl resorcinol.

6. The article of claim 1 wherein the vinyl ester is vinyl stearate.

7. The article of claim 1 wherein the vinyl ester is a mixture of vinyl acetate and vinyl stearate.

8. The article of claim 1 wherein the vinyl ester is vinyl pivalate.

9. The article of claim 1 wherein the vinyl ester is vinyl-2-hexoate.

10. The article of claim 1 wherein the thickness of said coating is within the range of from 0.01 mil to 1.5 mils.

11. A process for forming a weatherable film which comprises coating at least one surface of a film of polyethylene with a liquid coating composition comprised essentially of a volatile organic solvent having dissolved therein (1) a copolymer of vinyl fluoride and at least one vinyl ester of a saturated, aliphatic monocarboxylic acid having from 2 to 20 carbon atoms, said copolymer containing from 85% to 15% by weight of polyvinyl fluoride, and (2) from 5% to 25% by weight, based on the total weight of solids in said composition, of a colorless ultraviolet light absorbent material compatible with said copolymer, and thereafter drying the coated film to remove said volatile organic solvent.

12. The process of claim 11 wherein said ultraviolet light absorbent material is a substituted benzophenone derivative having the formula

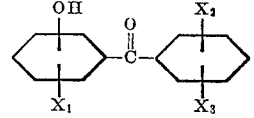

wherein $X_1$, $X_2$ and $X_3$ are each a radical selected from the group consisting of hydrogen, halogen, hydroxy, alkyl and alkoxy.

13. The process of claim 11 wherein the vinyl ester is vinyl acetate.

14. The process of claim 13 wherein the ultraviolet light absorbent material is a mixture of tetra-substituted benzophenone derivatives having the formula

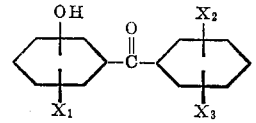

wherein $X_1$, $X_2$ and $X_3$ are each a radical selected from the group consisting of hydrogen, halogen, hydroxy, alkyl and alkoxy, said mixture containing a major proportion of 2,2'-dihydroxy-4,4'dimethoxybenzophenone.

References Cited in the file of this patent

UNITED STATES PATENTS

| | | |
|---|---|---|
| 2,062,179 | Hunter | Nov. 24, 1936 |
| 2,568,894 | Mackey | Sept. 25, 1951 |
| 2,678,285 | Welwyn | May 11, 1954 |
| 2,763,566 | Van Allan | Sept. 18, 1956 |
| 2,820,918 | Aronstein | Jan. 21, 1958 |